US007574345B2

(12) United States Patent
West et al.

(10) Patent No.: US 7,574,345 B2
(45) Date of Patent: Aug. 11, 2009

(54) METHOD AND SYSTEM FOR SIMULATING MULTIPLE CABLE MODEMS

(75) Inventors: James Randall West, Suwanee, GA (US); Darryl Hymel, Batavia, IL (US)

(73) Assignee: Arris Group, Inc., Suwanee, GA (US)

( * ) Notice: Subject to any disclaimer, the term of this patent is extended or adjusted under 35 U.S.C. 154(b) by 569 days.

(21) Appl. No.: 11/396,099

(22) Filed: Mar. 30, 2006

(65) Prior Publication Data

US 2007/0239391 A1 Oct. 11, 2007

Related U.S. Application Data

(60) Provisional application No. 60/666,355, filed on Mar. 30, 2005.

(51) Int. Cl.
*G06F 9/44* (2006.01)

(52) U.S. Cl. ............... 703/20; 703/21; 702/122; 375/222; 370/466

(58) Field of Classification Search ............ 703/13, 703/20, 21; 702/122; 375/222; 370/466, 370/386; 709/224

See application file for complete search history.

(56) References Cited

U.S. PATENT DOCUMENTS

| 6,085,238 A * | 7/2000 | Yuasa et al. ............ 709/223 |
| 7,376,123 B2 * | 5/2008 | Reuss ..................... 370/352 |
| 7,418,006 B2 * | 8/2008 | Damphier et al. ........ 370/466 |

OTHER PUBLICATIONS

Huang et al., N.F. A Hierarchical HFC Network with QoS Guaranteed Traffic Policy, IEEE Transactions on Broadcasting, vol. 44, Iss. 4, Dec. 1998, pp. 517-526.*

* cited by examiner

*Primary Examiner*—Russell Frejd
(74) *Attorney, Agent, or Firm*—Troy A. Van Aacken; Robert J. Starr

(57) ABSTRACT

A fixed MAC address of a cable modem is used to generate a series of unique MAC Addresses in order to simulate multiple cable modems from the CMTS's point of view. Before a scheduled maintenance operation, a simulated MAC address value is disbursed to pertinent hardware registers in the cable modem. When the station maintenance occurs, the simulated MAC address value is sent in place of the fixed original address.

19 Claims, 2 Drawing Sheets

METHOD AND SYSTEM FOR SIMULATING MULTIPLE CABLE MODEMS

CROSS REFERENCE TO RELATED APPLICATION

This application priority under 35 U.S.C. 119(e) to U.S. provisional patent application No. 60/666,355 entitled "Virtual cable modem simulator," which was filed Mar. 30, 2005, and is incorporated herein by reference in its entirety.

FIELD OF THE INVENTION

The present invention relates generally to communication devices, and more particularly to testing of cable modems and related equipment.

BACKGROUND

Cable data systems are used to allow cable TV subscribers to use the Hybrid-Fiber-Coax network as a communication link between their home networks and the Internet. As a result, computer information (Internet Protocol packets) can be transmitted across the Hybrid-Fiber-Coax network between home computers and the Internet. The DOCSIS specification (defined by CableLabs) specifies the set of protocols that must be used to effect a data transfer across the Hybrid-Fiber-Coax network. Two fundamental pieces of equipment permit this data transfer: a cable modem (CM) which is positioned in the subscriber's home, and a Cable Modem Termination System (CMTS) which is positioned in the head end of the cable TV company.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
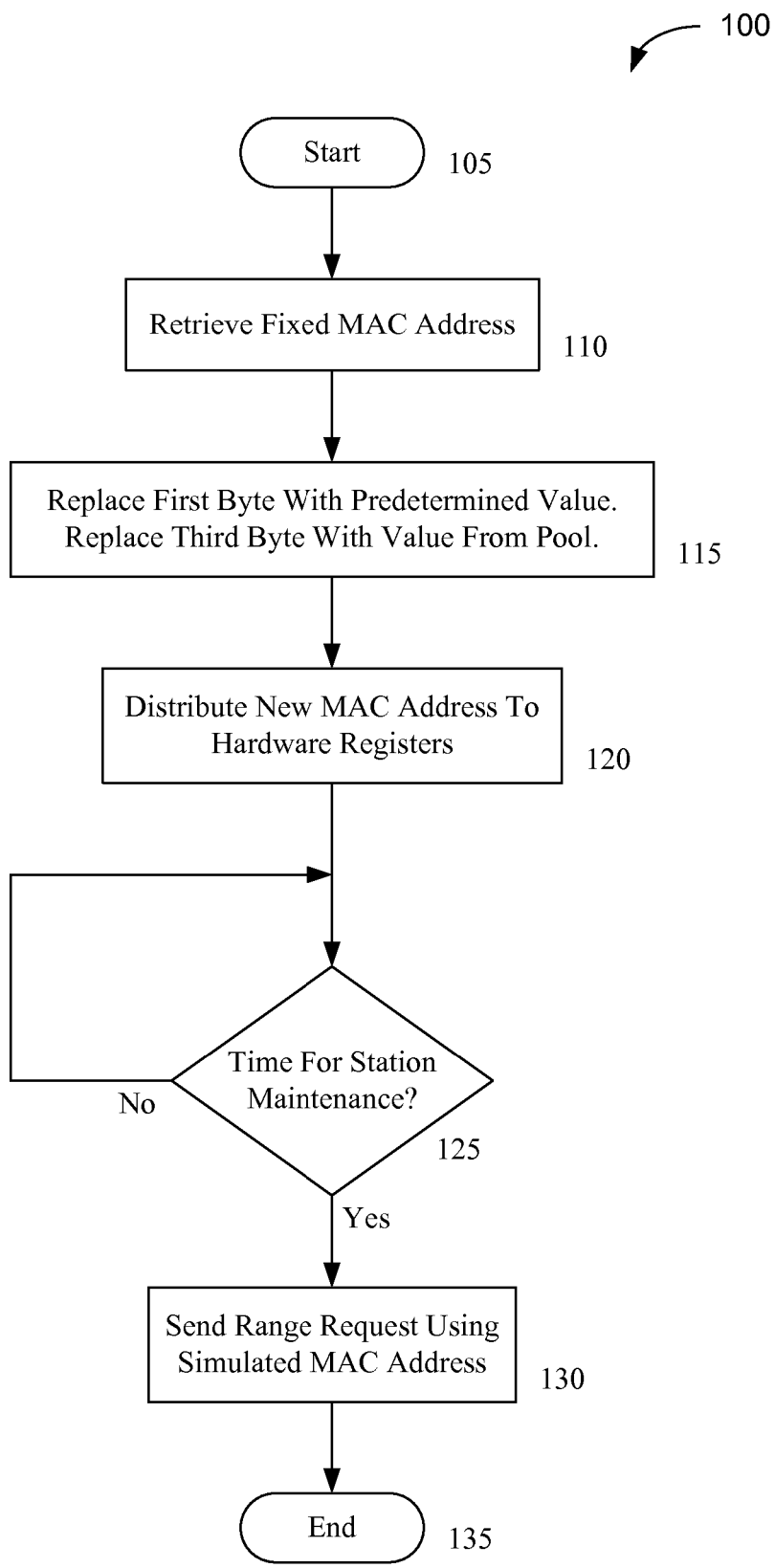
FIG. 1 illustrates a flow diagram showing a method for simulating a plurality of cable modems.

Turning now to the figures, FIG. 1 illustrates a method 100 for simulating multiple cable modems using a single cable modem and its associated MAC address. The method begins at step 105 and the modems fixed MAC address is retrieved at step 110. A unique simulated MAC address is derived from the modem's original MAC at step 115.

The RF simulator software uses these simulated MAC addresses to update the appropriate hardware registers at step 120. Thus, six modems can be simulated, with the addresses thereof corresponding to the original MAC address and the five simulated addresses.

The RF Simulator determines when to modify the hardware registers based on time. The CMTS typically sends down a Station Maintenance opportunity for each of its simulated modems according to a schedule. The simulator running in the modem modifies the MAC addresses and updates the hardware registers at step 120. A determination is made whether it is time to send out the next Range Request according to a station maintenance schedule at step 125. If it is not yet time to send a range request message, the process returns to step 125. If it is time to send a range request, the range request is sent at step 130. The process ends at step 135.

If for some reason a simulated modem is unable to transmit a Range Request, the simulated modem is reset, but the other simulated MAC addresses are kept active. The original MAC may be reset when others are unable to transmit a range request so that the original MAC address is the last to be used in a range and register sequence.

Figure 2:
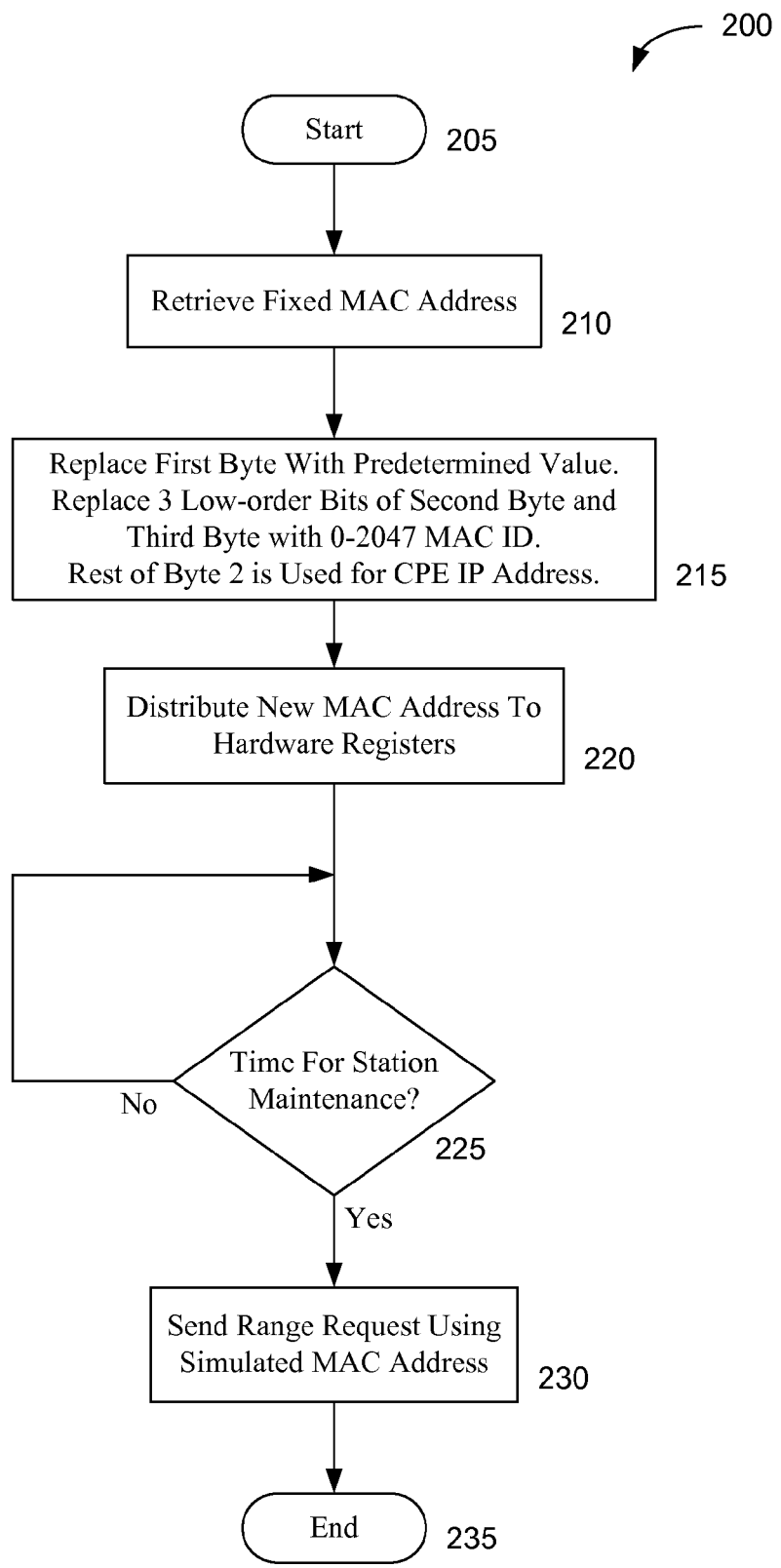
FIG. 2 illustrates a flow diagram showing a method for simulating a plurality of cable modems, with a plurality of IP addresses associated with each of the simulated modems.

Turning now to FIG. 2, a method 200 for simulating an IP simulator is shown. The IP Simulator algorithm 200 also derives simulated MAC addresses from the original, fixed MAC address of a cable modem. As with the RF modem simulator, after retrieving the fixed, or original, MAC address of a cable modem, or other device having a MAC address at step 210, the IP simulator generates a unique MAC address. The IP Simulator can create 2048 unique MAC Addresses and thereby can emulate 2048 modems. Each MAC address instantiation represents a fully functional CM at the time the CM is using that MAC address. The CM hardware modifies its MAC address and relevant hardware registers to appear as a completely new CM to the CMTS. The process ends at step 235.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for simulating a plurality of communication devices using a single communication device, the method comprising:

at a communication device, retrieving a fixed MAC address of the communication device;

generating a unique MAC address;

updating hardware registers within the communication device with a simulated MAC address; and sending a range and register request from the communication device to a centralized scheduler before a station maintenance operation is scheduled to occur.

2. The method of claim 1 wherein the communication device is a cable modem.

3. The method of claim 2 wherein the central scheduler is a cable modem termination system.

4. A method for simulating a plurality of communication devices using a single communication device, the method comprising:

at a communication device, retrieving a fixed MAC address of the communication device;

generating a unique simulated MAC address, wherein the unique simulated MAC address is derived from the fixed MAC address of the communication device;

updating hardware registers within the communication device with the unique simulated MAC address; and sending a range and register request to a centralized scheduler before a station maintenance operation is scheduled to occur.

5. The method of claim 4 wherein the communication device is a cable modem.

6. The method of claim 5 wherein the central scheduler is a cable modem termination system.

7. The method of claim 1 farther comprising the step of simulating the MAC address with an RF simulator.

8. The method of claim 7 wherein the MAC address is one of six (6) unique MAC addresses.

9. The method of claim 1 farther comprising the step of simulating the MAC address with an IP simulator.

10. The method of claim 9 wherein the MAC address is one of 2048 unique MAC addresses.

11. The method of claim 4 farther comprising the step of simulating the MAC address with an RF simulator.

12. The method of claim 11 wherein the MAC address is one of six (6) unique MAC addresses.

13. The method of claim 4 farther comprising the step of simulating the MAC address with an IP simulator.

14. The method of claim 13 wherein the MAC address is one of 2048 unique MAC addresses.

15. A method for simulating a plurality of cable modems using a single cable modem, the method comprising:

at a cable modem, retrieving a fixed MAC address of the cable modem;

generating a unique MAC address, wherein the unique MAC address is derived from the fixed MAC address of the cable modem;

updating hardware registers within the cable modem with the unique MAC address; and sending a range and register request from the cable modem to a cable modem termination system before a station maintenance operation is scheduled to occur.

16. The method of claim 15 further comprising the step of simulating the MAC address with an RF simulator.

17. The method of claim 16 wherein the MAC address is one of six (6) unique MAC addresses.

18. The method of claim 15 further comprising the step of simulating the MAC address with an IP simulator.

19. The method of claim 18 wherein the MAC address is one of 2048 unique MAC addresses.

* * * * *